United States Patent
Mahani et al.

(10) Patent No.: US 10,795,033 B2
(45) Date of Patent: Oct. 6, 2020

(54) SINGLE PHOTON EMISSION COMPUTED TOMOGRAPHY IMAGING WITH A SPINNING PARALLEL-SLAT COLLIMATOR

(71) Applicant: PARTO NEGAR PERSIA CO., Tehran (IR)

(72) Inventors: Hojjat Mahani, Isfahan (IR);
Mohammad Reza Ay, Tehran (IR);
Saeed Sarkar, Tehran (IR);
Mohammad Hossein Farahani, Tehran (IR)

(*) Notice: Subject to any disclaimer, the term of this patent is extended or adjusted under 35 U.S.C. 154(b) by 188 days.

(21) Appl. No.: 15/920,426

(22) Filed: Mar. 13, 2018

(65) Prior Publication Data
US 2018/0259656 A1 Sep. 13, 2018

Related U.S. Application Data

(60) Provisional application No. 62/470,363, filed on Mar. 13, 2017.

(51) Int. Cl.
*G01T 1/208* (2006.01)
*G01T 1/164* (2006.01)
*G06T 11/00* (2006.01)

(52) U.S. Cl.
CPC ............ *G01T 1/208* (2013.01); *G01T 1/1642* (2013.01); *G01T 1/1648* (2013.01); *G06T 11/005* (2013.01); *G06T 11/006* (2013.01); *G06T 11/008* (2013.01); *G06T 2211/424* (2013.01)

(58) Field of Classification Search
CPC ..... G01T 1/208; G01T 1/1642; G01T 1/1648; G01T 11/005; G01T 11/006; G01T 11/008; G01T 2211/424

USPC ...... 250/362, 363.04, 363.1, 370.09, 363.07, 250/363.02, 252.1, 363.09
See application file for complete search history.

(56) References Cited

U.S. PATENT DOCUMENTS

| | | | | |
|---|---|---|---|---|
| 4,873,632 A | * | 10/1989 | Logan | G01T 1/1642 250/363.02 |
| 5,565,684 A | * | 10/1996 | Gullberg | G01T 1/1615 250/363.04 |
| 5,903,008 A | * | 5/1999 | Li | G01T 1/1647 250/363.02 |
| 6,593,576 B2 | | 7/2003 | Zeng et al. | |
| 6,603,123 B1 | | 8/2003 | Zeng | |

(Continued)

OTHER PUBLICATIONS

Gagnon et al. "Use of SOLSTICE rotating-slat solid-state camera for small animal imaging." In Nuclear Science Symposium Conference Record, 2002 IEEE, vol. 3, pp. 1367-1369. IEEE, 2002.
(Continued)

*Primary Examiner* — Blake C Riddick
(74) *Attorney, Agent, or Firm* — Bajwa IP Law Firm; Haris Zaheer Bajwa

(57) ABSTRACT

A method and a system for single photon emission computed tomography (SPECT) imaging capable of performing a rapid acquisition of imaging data. The SPECT imaging system, placed at a fixed radial distance from the center of an object being imaged, includes a gamma detector and a collimator. The collimator, mounted on the gamma detector, includes a plurality of parallel slats, each perpendicular to the surface of the gamma detector. The method implemented by this system rapidly reconstructs a high-resolution and high-sensitivity image.

20 Claims, 15 Drawing Sheets

(56) References Cited

U.S. PATENT DOCUMENTS

| | | | |
|---|---|---|---|
| 6,627,893 B1 | 9/2003 | Zeng et al. | |
| 7,085,405 B1* | 8/2006 | Levkovitz | G06T 11/006 250/264 |
| 7,323,688 B2 | 1/2008 | Joung | |
| 7,375,337 B2 | 5/2008 | Gagnon | |
| 8,071,949 B2 | 12/2011 | Majewski et al. | |
| 8,575,555 B2 | 11/2013 | Wangerin et al. | |
| 2002/0130265 A1* | 9/2002 | Zerg | G01T 1/1644 250/363.04 |
| 2002/0177773 A1* | 11/2002 | Natterer | G06T 17/20 600/436 |
| 2003/0111609 A1* | 6/2003 | Zeng | G01T 1/1648 250/363.1 |
| 2005/0285042 A1* | 12/2005 | Joung | G01T 1/1644 250/363.02 |
| 2006/0124855 A1* | 6/2006 | Gagnon | A61B 6/037 250/370.09 |
| 2007/0217666 A1* | 9/2007 | Gal | G01T 1/1642 382/131 |
| 2008/0116386 A1* | 5/2008 | Wagenaar | G01T 1/1648 250/370.09 |
| 2009/0050811 A1* | 2/2009 | Barrett | G01T 1/1642 250/363.04 |
| 2009/0304150 A1* | 12/2009 | Metzler | G01T 1/1648 378/62 |
| 2010/0067758 A1* | 3/2010 | Casey | G06T 11/006 382/128 |
| 2010/0187425 A1* | 7/2010 | Majewski | A61B 6/037 250/363.05 |
| 2010/0243907 A1* | 9/2010 | Jansen | G06T 11/006 250/370.09 |
| 2011/0228999 A1* | 9/2011 | Hsieh | G06T 11/006 382/131 |
| 2012/0248320 A1* | 10/2012 | Wangerin | G01T 1/166 250/363.05 |
| 2012/0305812 A1 | 12/2012 | Bowen et al. | |
| 2012/0326034 A1* | 12/2012 | Sachs | G06T 11/005 250/336.1 |
| 2014/0371580 A1* | 12/2014 | Bhattacharya | A61B 6/037 600/426 |
| 2015/0119704 A1* | 4/2015 | Roth | G01T 1/1603 600/425 |
| 2015/0289832 A1* | 10/2015 | Bal | A61B 6/5264 600/411 |
| 2016/0166219 A1* | 6/2016 | Majewski | A61B 6/4405 250/362 |

OTHER PUBLICATIONS

Accorsi. "High-efficiency, high-resolution SPECT techniques for cardiac imaging." Proceedings of Science: Frontiers in Imaging Science: High Performance Nuclear Medicine Imagers for Vascular Disease Imaging (Brain and Heart, Rome, Italy, 2006) (2006).

Rozler et al. "Collimator interchange system for adaptive cardiac imaging in C-SPECT." IEEE Transactions on Nuclear Science 58, No. 5 (2011): 2226-2233.

Zeng et al. "Image reconstruction algorithm for a SPECT system with a convergent rotating slat collimator." IEEE Transactions on Nuclear Science 51, No. 1 (2004): 142-148.

Zeng. "Detector blurring and detector sensitivity compensation for a spinning slat collimator." IEEE transactions on nuclear science 53, No. 5 (2006): 2628-2634.

Zeng et al. "A sparse collimator for a rotating strip SPECT camera." In Nuclear Science Symposium Conference Record, 2003 IEEE, vol. 5, pp. 3257-3261. IEEE, 2003.

Gagnon et al. "Design considerations for a new solid-state gamma-camera: Soltice." In Nuclear Science Symposium Conference Record, 2001 IEEE, vol. 2, pp. 1156-1160. IEEE, 2001.

Vandenberghe et al. "Sensitivity of SPECT with rotating slat collimators." In Nuclear Science Symposium Conference Record, 2003 IEEE, vol. 4, pp. 2014-2018. Ioeo, 2003.

Lodge et al "A prototype rotating slat collimator for single photon emission computed tomography." IEEE transactions on medical imaging 15, No. 4 (1996): 500-511.

Vandfnreirghe et al. "System characteristics of SPECT with a slat collimated strip detector." Physics in medicine and biology 51, No. 2 (2006): 1-17.

Van Holen et al. "Contrast noise behaviour of a rotating slat collimated gamma camera." Nuclear Instruments and Methods in Physics Research Section A: Accelerators, Spectrometers, Detectors and Associated Equipment 571, No. 1 (2007): 274-277.

Wang et al. "3D RBI-EM reconstruction with spherically-symmetric basis function for SPECT rotating slat collimator." Physics in medicine and biology 49, No. 11 (2004): 2273-2292.

Van Holen et al. "Comparing planar image quality of rotating slat and parallel hole collimation: influence of system modeling." Physics in medicine and biology 53, No. 7 (2008): 1989.

Zeng et al. "A local iterative reconstruction algorithm for planar integral data." In Nuclear Science Symposium Conference Record, 2002 IEEE, vol. 2, pp. 751-755. IEEE, 2002.

Zhou et al. "Comparison between parallel hole and rotating slat collimation: Analytical noise propagation models." IEEE transactions on medical imaging 29, No. 12 (2010): 2038-2052.

Boisson et al. "Determination of optimal collimation parameters for a rotating slat collimator system: a system matrix method using ML-EM." Physics in Medicine & Biology 61, No. 6 (2016): 2302-2318.

Van Holen et al. "Fast 3D iterative image reconstruction for SPECT with rotating slat collimators." Physics in medicine and biology 54, No. 3 (2009): 715-729.

Zhou et al. "Parallel hole and rotating slat collimators: Comparative study using digital contrast phantoms." IEEE Transactions on Nuclear Science 60, No. 5 (2013): 3282-3289.

Crystals, Saint-Gobain. "CsI (Tl), CsI (Na), Cesium Iodide Scintillation Material." (2012).

Walrand et al. "Evaluation of novel whole-body high-resolution rodent SPECT (Linoview) based on direct acquisition of linogram projections." Journal of Nuclear Medicine 46, No. 11 (2005): 1872-1880.

Vandenberghe et al. "Sensitivity of SPECT with rotating slat collimators." In Nuclear Science Symposium Conference Record, 2003 IEEE, vol. 4, pp. 2914-2918. Ieee, 2003.

Vandenberghe et al. "System characteristics of SPECT with a slat collimated strip detector." Physics in medicine and biology 51, No. 2 (2006): 1-17.

* cited by examiner

SINGLE PHOTON EMISSION COMPUTED TOMOGRAPHY IMAGING WITH A SPINNING PARALLEL-SLAT COLLIMATOR

CROSS-REFERENCE TO RELATED APPLICATION

This application claims the benefit of priority from U.S. Provisional Patent Application Ser. No. 62/470,363, filed on Mar. 13, 2017, and entitled "A COMPACT CARDIAC SPECT SCANNER WITH SPINNING PARALLEL-SLAT COLLIMATOR," which is incorporated herein by reference in its entirety.

SPONSORSHIP STATEMENT

This application has been sponsored by Iran Patent Center.

TECHNICAL FIELD

The present disclosure generally relates to medical imaging, and particularly, to single photon emission computed tomography imaging.

BACKGROUND

The most widely-used collimator in clinical cardiac single-photon emission computed tomography (SPECT) studies is the parallel-hole collimator. However, the fundamental sensitivity-resolution tradeoff is a challenge in SPECT scanner design. Nevertheless, in dynamic cardiac SPECT, increasing both sensitivity and resolution is necessary due to the need for lower image noise.

Spinning parallel-slat collimators are often viewed as suitable alternatives to conventional parallel-hole collimators. Spinning parallel-slat collimators provide a better sensitivity to resolution compromise for cardiac SPECT applications. Several SPECT prototypes have been introduced that are based on spinning parallel-slat collimators, exhibiting a comparable performance as with traditional parallel-hole collimators. Although the performance of such prototypes appears promising, the lack of both fast image reconstruction methods and appropriate imaging settings from a clinical standpoint impede further developments. For example, existing SPECT imaging systems commonly acquire 128 spin and 128 SPECT views (up to total 16384 projections), leading to a very long total scan time. Moreover, most of these systems use iterative reconstruction methods based on planar projections for image reconstruction, which require calculation of a massive system matrix (up to several gigabytes). Large numbers of iterations prior to convergence is another requirement for these methods, which further increases the computational cost. Thus, these methods can be inefficient for use in clinical practice.

There is, therefore, a need for a SPECT imaging system capable of performing a rapid acquisition of imaging data. There is also a need for a rapid image reconstruction method to reconstruct a high-resolution and high-sensitivity image in a short time.

SUMMARY

This summary is intended to provide an overview of the subject matter of the present disclosure, and is not intended to identify essential elements or key elements of the subject matter, nor is it intended to be used to determine the scope of the claimed implementations. The proper scope of the present disclosure may be ascertained from the claims set forth below in view of the detailed description below and the drawings.

In one general aspect, the present disclosure describes a method for single photon emission computed tomography (SPECT) imaging. The method includes acquiring a plurality of SPECT planar projection vectors by a SPECT imaging system, generating a plurality of scatter-corrected vectors from the plurality of SPECT planar projection vectors, and generating a spinogram from the plurality of scatter-corrected vectors. The method also includes producing or creating a sensitivity map for the SPECT imaging system, generating an initial image, and reconstructing a final image from the initial image by applying an image reconstruction algorithm on the initial image. Furthermore, the image reconstruction algorithm may include applying the sensitivity map on the initial image. The SPECT imaging system is configured to be placed or disposed at a fixed radial distance from the center of an object being imaged. The center of the initial image may be located at or correspond to the center of the object. The plurality of SPECT planar projection vectors may include a plurality of photopeak projection vectors and a plurality of scatter projection vectors. The SPECT imaging system may include a gamma detector and a collimator. The collimator may include a plurality of parallel slats. Each of the plurality of parallel slats may be perpendicular to the surface of the gamma detector. The collimator may be mounted on the gamma detector.

The above general aspect may include one or more of the following features. In some implementations, acquiring the plurality of SPECT planar projection vectors may also include spinning the SPECT imaging system about a first spin axis, rotating the SPECT imaging system about a SPECT rotation axis, spinning the SPECT imaging system about a second spin axis of a plurality of spin axes, and acquiring a SPECT planar projection vector of the plurality of SPECT planar projection vectors. The first spin axis may be perpendicular to the surface of the gamma detector and may pass through the center of the object. In addition, the SPECT rotation axis may be perpendicular to the first spin axis and may pass through the center of the object. The plurality of spin axis may be perpendicular to the SPECT rotation axis and may pass through the center of the object.

In another example, generating the spinogram may include generating a three-dimensional matrix. The three-dimensional matrix may include a first dimension, a second dimension, and a third dimension. The first dimension may correspond to each of the plurality of scatter-corrected vectors. The second dimension may correspond to a SPECT spin angle of a plurality of SPECT spin angles, and the third dimension may correspond to a SPECT rotation angle of a plurality of SPECT rotation angles. The SPECT spin angle may be defined as an angle between a collimator axis and the SPECT rotation axis. The collimator axis may be perpendicular to the planes of the plurality of parallel slats and may pass through the center of the object. The SPECT rotation angle may be defined as an angle between the second spin axis and the first spin axis.

In another implementation, creating the sensitivity map may include creating a three-dimensional matrix. The three-dimensional matrix may cover the field-of-view of the collimator. In some other implementations, generating the initial image may include generating a three-dimensional all-ones matrix. In different implementations, reconstructing the final image may include spinning the initial image about the first spin axis, rotating the initial image about the SPECT rotation axis, spinning the initial image about a third spin axis of the plurality of spin axes, generating a modified image by applying the sensitivity map on the initial image, generating an image planar projection vector of the plurality of image planar projection vectors through a forward projection process, calculating a reconstruction error between the image planar projection vector and a scatter-corrected vector of the plurality of scatter-corrected vectors, and/or updating the modified image by backward projecting the reconstruction error to the modified image. The modified image may include a plurality of voxels. The scatter-corrected vector may correspond to the image planar projection vector.

In one example, generating the image planar projection vector may include calculating a value for each element in the image planar projection vector. The value may include a sum of values of voxels in a voxels subset. The voxels subset may be selected from the plurality of voxels. Each voxel in the voxels subset may be located in an image plane of a plurality of image planes. The plurality of image planes may be perpendicular to the image axis and may pass through at least one of the plurality of voxels.

In some implementations, updating the modified image may include multiplying the value of each voxel in the voxels subset by the reconstruction error. In other implementations, calculating the reconstruction error may include calculating the ratio between corresponding elements in the image planar projection vector and the scatter-corrected vector.

In some cases, reconstructing the final image from the initial image may be repeated in a cycle until a convergence condition is satisfied. The final image may replace the initial image at the end of the cycle. The convergence condition may include at least one of a first condition and a second condition. The first condition may include the reconstruction error being smaller than a given threshold. The second condition may include reconstructing the final image from the initial image being repeated for ten times.

In another general aspect, the present disclosure is directed to a single photon emission computed tomography (SPECT) imaging system. The system can include a gamma detector made of or including a monolithic scintillator. In another implementation, the system includes a monolithic scintillator with a monolithic CsI (Na) crystal. In some cases, the gamma detector may be coupled with a silicon photomultiplier (SiPM) readout system.

As another example, the number of the plurality of SEPCT rotation angles may be equal to or smaller than 16. In one implementation, the number of the plurality of SEPCT spin angles may be equal to or smaller than 16. In another implementation, the size of the SPECT imaging system may be equal to or smaller than about 30 cm ʌ 15 cm ʌ 5 cm.

Other systems, methods, features and advantages of the implementations will be, or will become, apparent to one of ordinary skill in the art upon examination of the following figures and detailed description. It is intended that all such additional systems, methods, features and advantages be included within this description and this summary, be within the scope of the implementations, and be protected by the claims herein.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

Figure 1:
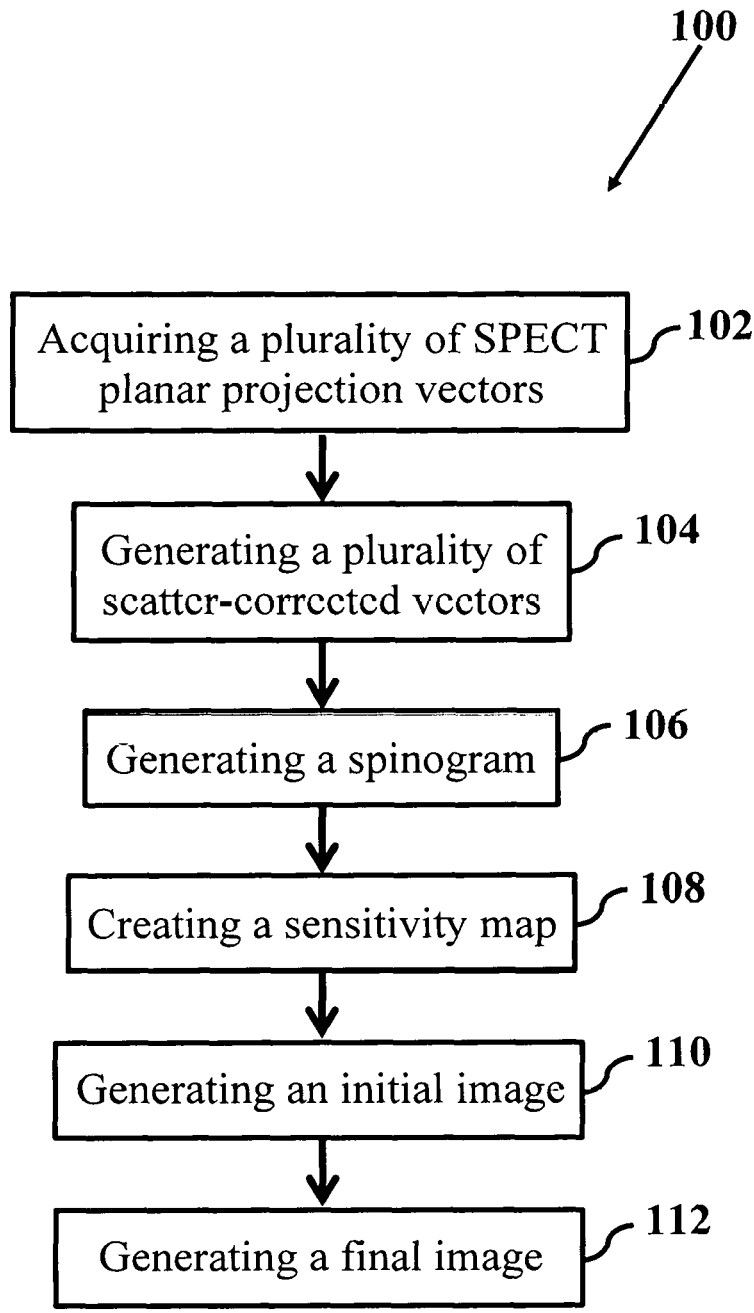
FIG. 1 is a flowchart presenting an implementation of a method for single photon emission computed tomography (SPECT) imaging.

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

The following detailed description is presented to enable a person skilled in the art to make and use the methods and devices disclosed in exemplary embodiments of the present disclosure. For purposes of explanation, specific nomenclature is set forth to provide a thorough understanding of the present disclosure. However, it will be apparent to one skilled in the art that these specific details are not required to practice the disclosed exemplary embodiments. Descriptions of specific exemplary embodiments are provided only as representative examples. Various modifications to the exemplary implementations will be readily apparent to one skilled in the art, and the general principles defined herein may be applied to other implementations and applications without departing from the scope of the present disclosure. The present disclosure is not intended to be limited to the implementations shown, but is to be accorded the widest possible scope consistent with the principles and features disclosed herein As discussed above, there is a need for a SPECT imaging system capable of performing a rapid acquisition of imaging data, as well as a more rapid image reconstruction method to reconstruct a high-resolution and high-sensitivity image. Herein is disclosed a novel method and system for single photon emission computed tomography (SPECT) imaging.

As a general overview, the system can include a spinning parallel-slat collimator mounted on or otherwise associated with a gamma detector. In one implementation, the gamma detector may include a monolithic scintillator coupled with a silicon photomultiplier readout system. Furthermore, in some implementations, the method includes acquiring projection data in a step-and-shoot mode, generating an initial image and a sensitivity map, and reconstructing a final image from the initial image. In one example, the system may rotate about a rotation axis, stop at certain steps, and then spin about a spinning axis at each rotation step. In addition, the system may acquire projection data at certain angles (spin angles) during spinning. An offset angle may be introduced prior to spinning at each rotation step, to avoid the acquisition of redundant data.

In some implementations, after the projection data has been fully acquired, the initial image and the sensitivity map may be generated. The initial image may then rotate and spin in opposite directions relative to the system rotation and spin axes. At certain angles corresponding to the spin angles, the sensitivity map may be applied onto the initial image, and planar projection data may be calculated. In some cases, the calculated projection data may correspond to the acquired projection data. A reconstruction error between the acquired data and the calculated data may be calculated, and the final image may be reconstructed by backward projecting the reconstruction error to the initial image. After a complete spin at each rotation step, a new image may be available. Reconstructing the final image from the initial image can be repeated until the reconstruction error falls below a given threshold, or the number of iterations reaches a given threshold. The final image may replace the initial image following each iteration and be used as an initial image for the next iteration.

Referring now to FIG. 1, a flowchart of an implementation of a method 100 for single photon emission computed tomography (SPECT) imaging is presented. As shown in FIG. 1, the method 100 may include one or more of the following steps: acquiring a plurality of SPECT planar projection vectors by a SPECT imaging system (a first step 102), generating a plurality of scatter-corrected vectors from the plurality of SPECT planar projection vectors (a second step 104), generating a spinogram from the plurality of scatter-corrected vectors (a third step 106), creating a sensitivity map for the SPECT imaging system (a fourth step 108), generating an initial image (a fifth step 110), and reconstructing a final image from the initial image by applying an image reconstruction algorithm onto the initial image (a sixth step 112).

In different implementations, the SPECT imaging system may measure weighted planar projections of an object being imaged. Thus, the image reconstruction algorithm may also include a step of applying the sensitivity map onto the initial image to compensate for this weighting. In some examples, reconstructing the final image from the initial image (the sixth step 112) is repeated in a cycle until a convergence condition is satisfied. The final image may replace the initial image at the end of the cycle.

Figure 2:
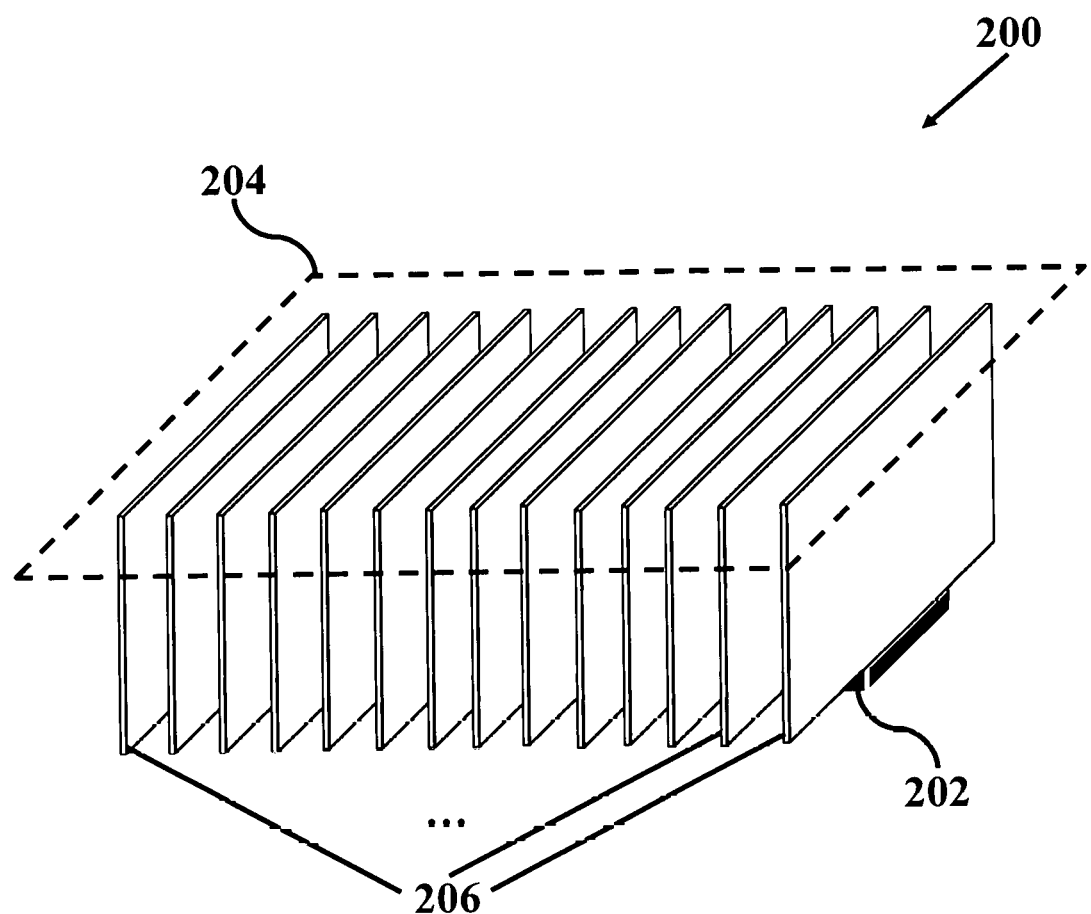
FIG. 2 illustrates an implementation of a SPECT imaging system.
Figure 3:
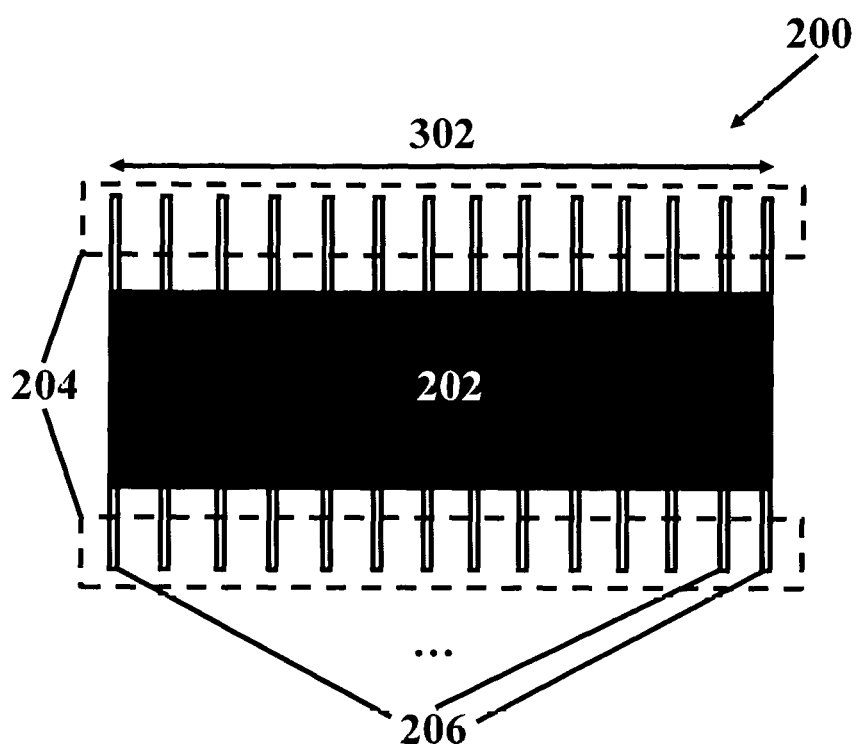
FIG. 3 is a rear view of an implementation of a SPECT imaging system.

For purposes of clarity, FIGS. 2 and 3 provide details regarding a SPECT imaging system 200. As shown in the implementation presented in FIG. 2 the SPECT imaging system 200 may include a gamma detector 202 and a collimator 204. In one implementation, the collimator 204 may include a plurality of parallel slats 206. In some implementations, each of the plurality of parallel slats 206 may be perpendicular to the surface of the gamma detector 202. In addition, the collimator 204 may be disposed adjacent to or mounted on the gamma detector 202. In some implementations, the gamma detector 202 may be coupled with a silicon photomultiplier (SiPM) readout system.

FIG. 3 is a rear view of the SPECT imaging system 200 of FIG. 2. In some implementations, the gamma detector 202 may include a monolithic scintillator. Furthermore, the monolithic scintillator may include a monolithic CsI (Na) crystal in one implementation. The monolithic crystal can afford both better energy resolution and lower cost relative to a pixelated crystal. The field of view (FOV) 302 correlating to the length of the collimator 204 is also shown in in FIG. 3.

Figure 4:
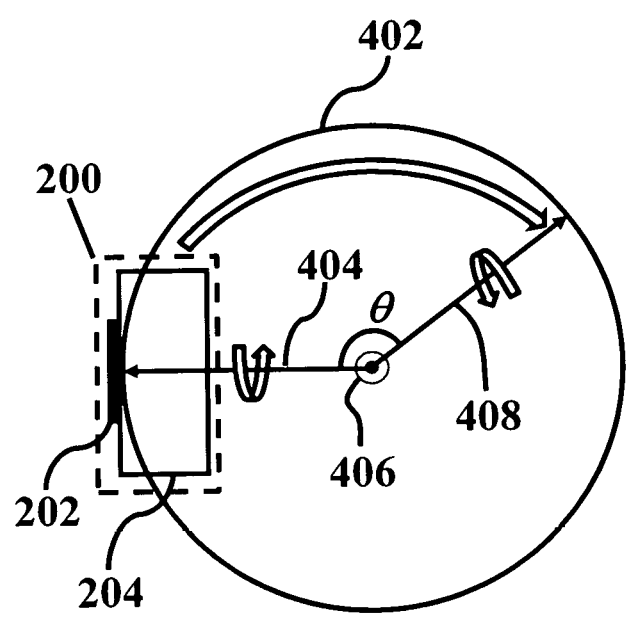
FIG. 4 illustrates a cross-section of an object being imaged by a SPECT imaging system according to one implementation of the present disclosure.
Figure 5:
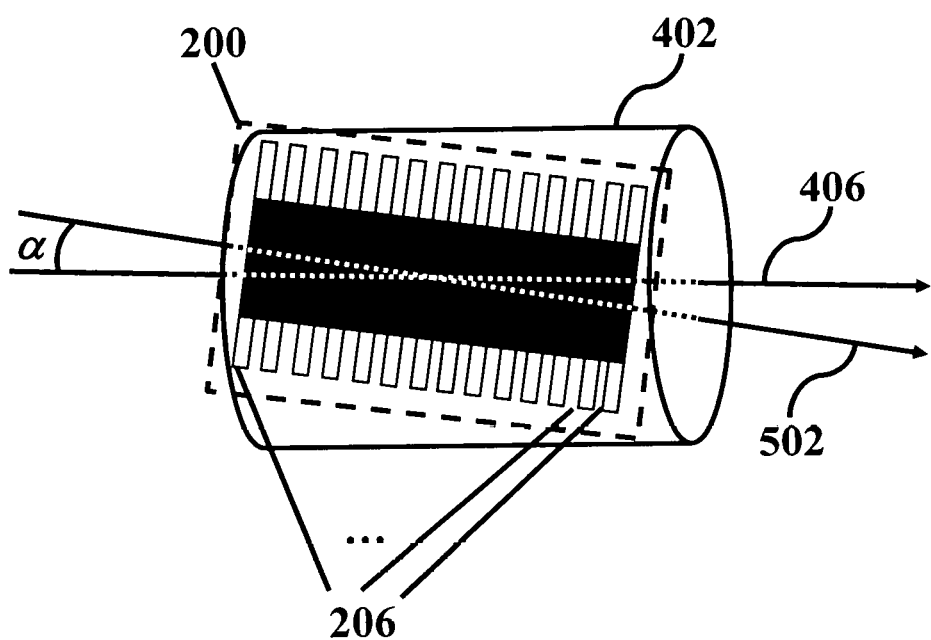
FIG. 5 is an isometric view of an object being imaged by a SPECT imaging system according to one implementation of the present disclosure.

Referring next to FIGS. 4 and 5, additional details are provided with respect to one implementation of an object that has been scanned using the SPECT imaging system 200. FIG. 4 depicts a cross-section of an object 402 being imaged by the SPECT imaging system 200, according to one or more implementations of the present disclosure. In some implementations, the SPECT imaging system 200 may be disposed at a substantially fixed radial distance from the center of the object 402. In some implementations, the SPECT imaging system 200 may be configured to spin about a first spin axis 404, in order to guarantee an acquisition of sufficient tomographic data. In one implementation, the first spin axis 404 may be perpendicular to the surface of the gamma detector 202 and may pass through the center of the object 402. In other examples, the SPECT imaging system 200 may be configured to rotate about a SPECT rotation axis 406. The SPECT rotation axis 406 may be perpendicular to the first spin axis 404 and may pass through the center of the object 402. In other implementations, the SPECT imaging system 200 may be configured to spin about a second spin axis 408 of a plurality of spin axes after being rotated about the SPECT rotation axis 406 to a SPECT rotation angle θ of a plurality of SPECT rotation angles. For purposes of this description, the SPECT rotation angle θ may be defined as an angle between the second spin axis 408 and the first spin axis 404. The second spin axis 408 may be perpendicular to the SPECT rotation axis 406 and may pass through the center of the object 402.

FIG. 5 is a three-dimensional view of the object 402 being imaged by the SPECT imaging system 200, according to one or more implementations of the present disclosure. A SPECT spin angle α of a plurality of SPECT spin angles may be defined as an angle between a collimator axis 502 and the SPECT rotation axis 406. The collimator axis 502 may be perpendicular to the planes of the plurality of parallel slats 206 and pass through the center of the object 402.

In some implementations, the process of acquiring the plurality of SPECT planar projection vectors (first step 102 of FIG. 1) may include one or more of the following steps: spinning the SPECT imaging system about the first spin axis 404, rotating the SPECT imaging system 200 about the SPECT rotation axis 406, spinning the SPECT imaging system 200 about the second spin axis 408 when the SPECT rotation angle θ satisfies a condition according to θ=mπ/$N_r$. The process may also include acquiring a SPECT planar projection vector of the plurality of SPECT planar projection vectors when the SPECT spin angle α satisfies a condition according to α=$α_o$+nπ/$N_s$, where $N_r$ is the number of the plurality of SPECT rotation angles, 0≤m<$N_r$ is an integer number, $α_o$ is an offset angle, $N_s$ is the number of the plurality of SPECT spin angles, and 0≤n<$N_s$ is an integer number associated to the SPECT planar projection vector. In some implementations, the number of the plurality of SEPCT rotation angles $N_r$ may be equal to or smaller than 16. In other implementations, the number of the plurality of SEPCT spin angles may be equal to or smaller than 16. In cases involving a circular orbit SPECT, at α=0 spin views, that is the spin views in which the collimator axis 502 is parallel to the SPECT rotation axis 406, similar data may be acquired by the SPECT imaging system 200 at different rotation angles, if the photon attenuation is neglected. The offset angle $α_o$ is introduced to compensate in these cases. Thus, such data redundancy can be avoided by applying the offset angle $α_o$.

In implementations where the emission data acquired by the SPECT imaging system 200 includes scattered events and the gamma detector 202 has a finite energy resolution, a scatter correction strategy may be needed. The plurality of SPECT planar projection vectors may include a plurality of photopeak projection vectors and a plurality of scatter projection vectors. In one implementation, a dual-energy window can be used for scatter correction. In some examples, generating the plurality of scatter-corrected vectors (second step 104 of FIG. 1) may include generating each of the plurality of scatter-corrected vectors by removing the plurality of scatter projection vectors from the plurality of photopeak projection vectors, according to an operation defined by:

$$P_{corrected} = P_{photopeak} - k\left(S \times \frac{W_{photopeak}}{W_{scatter}}\right) \quad \text{Equation (1)}$$

where $P_{corrected}$ is a scatter-corrected vector of the plurality of scatter-corrected vectors, $P_{photopeak}$ is a photopeak projection vector of the plurality of photopeak projection vectors, acquired at the SPECT rotation angle θ and the SPECT spin angle α in a photopeak window, S is a scatter projection vector of the plurality of scatter projection vectors, acquired at the SPECT rotation angle θ and the SPECT spin angle α in a scatter window, $W_{photopeak}$ is the width of the photopeak window, $W_{scatter}$ is the width of the scatter window, and k is a calibration factor. In some implementations, k may be set to 0.5.

In some implementations, generating the spinogram (third step 106 of FIG. 1) may include generating a three-dimensional matrix. The three-dimensional matrix may include a first dimension, a second dimension, and a third dimension. The first dimension may correspond to each of the plurality of scatter-corrected vectors. The second dimension may correspond to the plurality of SPECT spin angles. The third dimension may correspond to the plurality of SPECT rotation angles.

Furthermore, in some implementations, creating the sensitivity map (fourth step 108 of FIG. 1) may include creating a three-dimensional matrix. Referring to FIG. 3, in one implementation, the sensitivity map may cover the FOV 302 of the collimator 204.

In some implementations, generating the initial image (fifth step 110 of FIG. 1) may include generating a three-dimensional all-ones matrix.

Figure 6:
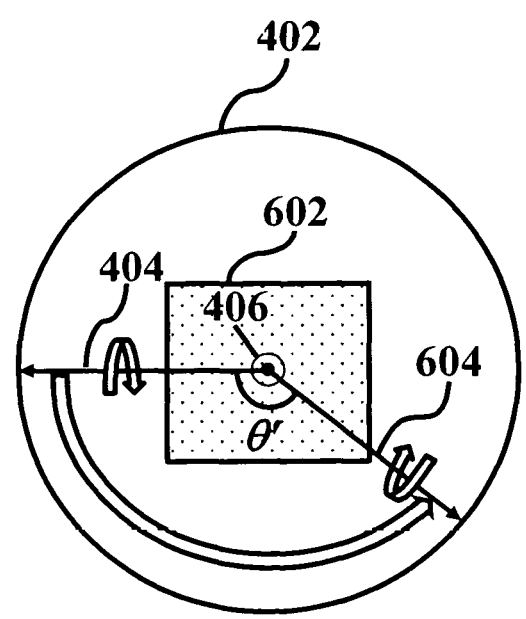
FIG. 6 illustrates a cross-section of an initial image of an object being imaged by a SPECT imaging system according to one implementation of the present disclosure.

Referring next to FIG. 6, a cross-section of an initial image 602 of the object 402 is depicted, according to one or more implementations of the present disclosure. In some implementations, the center of the initial image may be located at the center of the object 402. For purposes of reference, an image rotation angle θ' of a plurality of image rotation angles may be defined as an angle between a third spin axis 604 of the plurality of spin axes and the first spin axis 404.

Figure 7:
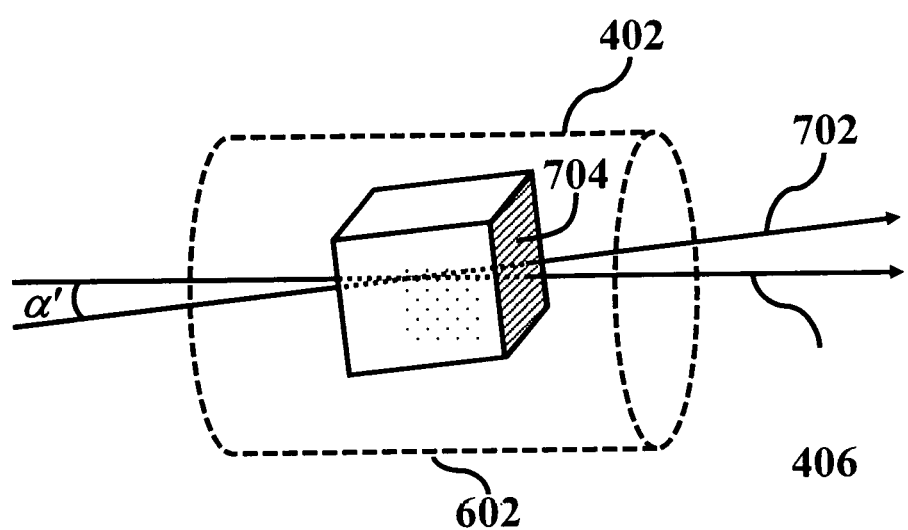
FIG. 7 is an isometric view of an initial image of an object according to one implementation of the present disclosure.

FIG. 7 depicts a three-dimensional view of the initial image 602 of the object 402, according to one or more implementations of the present disclosure. In some implementations, an image spin angle α' of a plurality of image spin angles may be defined as an angle between an image axis 702 and the SPECT rotation axis 406. In one implementation, the image axis 702 is parallel to the plane of the gamma detector 202, and perpendicular to a surface 704 of the initial image 602, and may pass through the center of the initial image 602.

Figure 8:
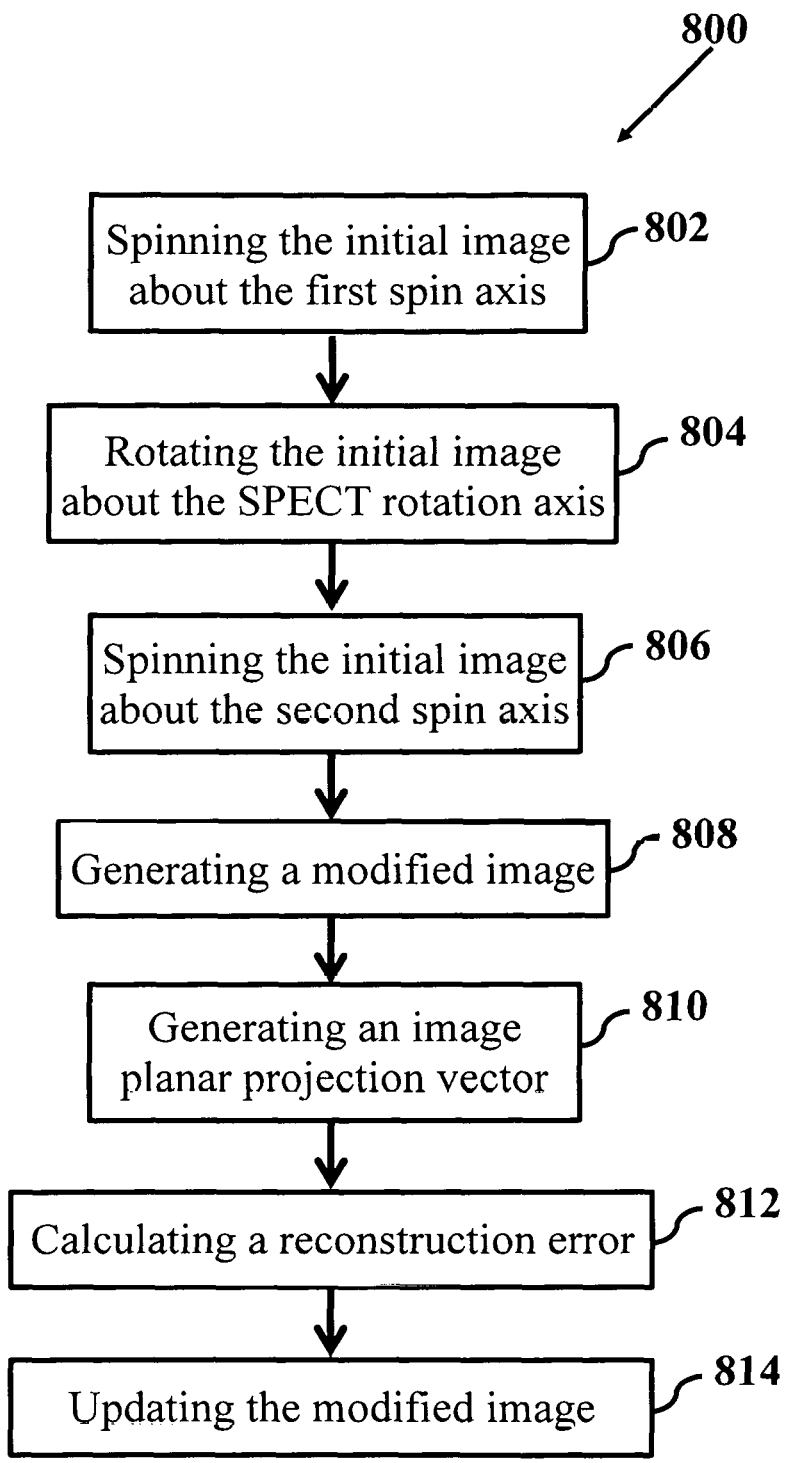
FIG. 8 is a flowchart presenting an implementation of a reconstruction algorithm for reconstruction of a final image from an initial image.

FIG. 8 is a flowchart of an implementation of a fast and simple image reconstruction algorithm 800 for the reconstruction of a final image from the initial image 602 (sixth step 112 of FIG. 1), according to one or more implementations of the present disclosure. The image reconstruction algorithm 800 may be referred to as Ordered-Subsets Expectation-Maximization (OSEM). As shown in FIG. 8, in some implementations, the process of reconstructing the final image (sixth step 112) may include one or more steps, including spinning the initial image about the first spin axis 404 (a first step 802), rotating the initial image about the SPECT rotation axis 406 (a second step 804), and/or spinning the initial image about the second spin axis 408 when the image rotation angle θ' of satisfies a condition according to θ'=-mπ/$N_r$ (a third step 806). The process may also include generating a modified image by applying the sensitivity map on the initial image 602 when the image spin angle α' satisfies a condition according to α'=-$α_o$-nπ/$N_s$ (a fourth step 808), and/or generating an image planar projection vector of the plurality of image planar projection vectors through a forward projection process (a fifth step 810). Furthermore, the process may involve calculating a reconstruction error between the image planar projection vector and a scatter-corrected vector of the plurality of scatter-corrected vectors (a sixth step 812), and/or updating the modified image by backward projecting the reconstruction error to the modified image (a seventh step 814).

In one implementation, the rotation direction of the initial image 602 may be opposite the rotation direction of the SPECT imaging system 200, such that θ'=-θ. In addition, in another implementation, the spin direction of the initial image 602 may be opposite the spin direction of the SPECT imaging system 200, so that α'=-α. At each image rotation angle θ', a complete spin may be performed, thereby ensuring each of the plurality of image spin angles is covered. As a result, the image can be updated at each of the plurality of image rotation angles. The SPECT imaging system 200 can thus provide a reconstructed image of the object 402 once per SPECT view. The image planar projection vector may be associated with the integer number n. Furthermore, in implementations where the integer number n is associated with the SPECT planar projection vector, and the SPECT planar projection vector correspond to the scatter-corrected vector according to Equation (1), the scatter-corrected vector can correspond to the image planar projection vector.

Figure 9:
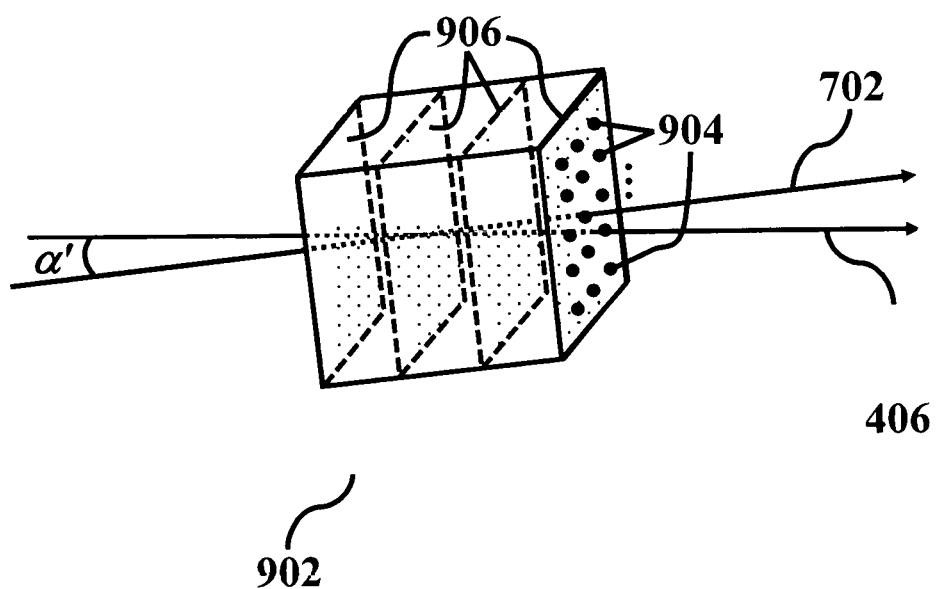
FIG. 9 is an isometric view of a modified image from an initial image according to one implementation of the present disclosure.

FIG. 9 is a representation of a three-dimensional view of a modified image 902, according to one or more implementations of the present disclosure. In one implementation, the modified image 902 may include a plurality of voxels. A voxels subset 904 may be selected from the plurality of voxels. Each voxel in the voxels subset 904 may be located in an image plane of a plurality of image planes 906. The plurality of image planes 906 may be perpendicular to the image axis 702, and pass through at least one of the plurality of voxels.

In some implementations, generating the image planar projection vector (fifth step 810 of FIG. 8) may include calculating a value for each element in the image planar projection vector. In such cases, the value may include a sum of values of voxels in the voxels subset 904.

In different implementations, calculating the reconstruction error (sixth step 812 of FIG. 8) includes calculating the ratio between corresponding elements in the image planar projection vector and the scatter-corrected vector. For each image planar projection vector of the plurality of image planar projection vectors, and the corresponding scatter-corrected vector of the plurality of scatter-corrected vectors, a different reconstruction error may be calculated. In one implementation, updating the modified image 902 (seventh step 814 of FIG. 8) may include multiplying the value of each voxel in the voxels subset 904 by the reconstruction error.

The reconstruction error can be used to define the convergence condition. In different implementations, the convergence condition may include at least one of a first condition and a second condition. The first condition may include the reconstruction error being smaller than a given threshold. The second condition may include reconstructing the final image from the initial image (sixth step 112 of FIG. 1) being repeated at least ten times.

Example

Table 1 presents the specifications of one example of a heart-dedicated SPECT imaging system. The size of this example system is about 30 cm×15 cm×5 cm. In addition, the example system includes of a series of highly attenuating parallel slats mounted on a monolithic CsI(Na) crystal. Planar projections are acquired at $N_s$=16 SPECT spin angles, over a 180° span. To adapt the example system for cardiac applications, the system rotates around 180° with 16 stops, at $N_r$=16 SPECT rotation angles. Therefore, there are a total of 256 planar projections (16 SPECT spin angles×16 SPECT rotation angles). Total scan time is set to 32 min. The radius-of-rotation (ROR) of the system is set to 20 cm. Using the monolithic CsI(Na) crystal along with SiPM readout provides a low-weight, small-footprint, low-cost, and magnetic resonance (MR)-compatible cardiac SPECT imaging system.

TABLE 1

Specifications of an example heart-dedicated SPECT imaging system

| Parameter | Specification |
| --- | --- |
| Detector type | Monolithic CsI(Na), 9 mm thick, 5.6 cm width |
| Collimator material | Tungsten (W) |
| Collimator length (FOV) | 280 mm |
| Collimator height | 40 mm |
| Slat thickness | 0.25 mm |
| Slat spacing | 2 mm |
| Collimator width | 120 mm |
| Readout | SiPM |

The example SPECT imaging system was first modeled within the GATE simulator. Photoelectric, Compton scattering, electron ionizations, multiple scattering, and Bremsstrahlung phenomena were considered as particle interactions. To accelerate the GATE simulation, the transportation of the secondary electrons within both the phantoms and the collimator was ignored. The rationale behind this strategy is that tracking of these secondary particles is very time-consuming and does not provide sufficiently useful imaging information. Intrinsic spatial- and energy resolution of the CsI(Na) crystal/SiPM readout pair, dead-time of the crystal, and half time of the $^{99m}$Tc tracer (for $^{99m}$Tc-sestamibi (MIBI) SPECT scans) were taken into account during simulations.

The offset angle $\alpha_o$ was set to the half the SPECT spin angle increment, that is, $$\frac{180°}{N_s}.$$

For $N_s$=16, and the SPECT spin angle increment was equal to 11.25°. Therefore, the offset angle $\alpha_o$ in this case would be about 5.6°.

To implement scatter correction in accordance with Equation (1) above, the photopeak window was centered at 140 keV, with $W_{photopeak}$=28 keV. The scatter window was centered at 120 keV, with $W_{scatter}$=10 keV.

Figure 10:
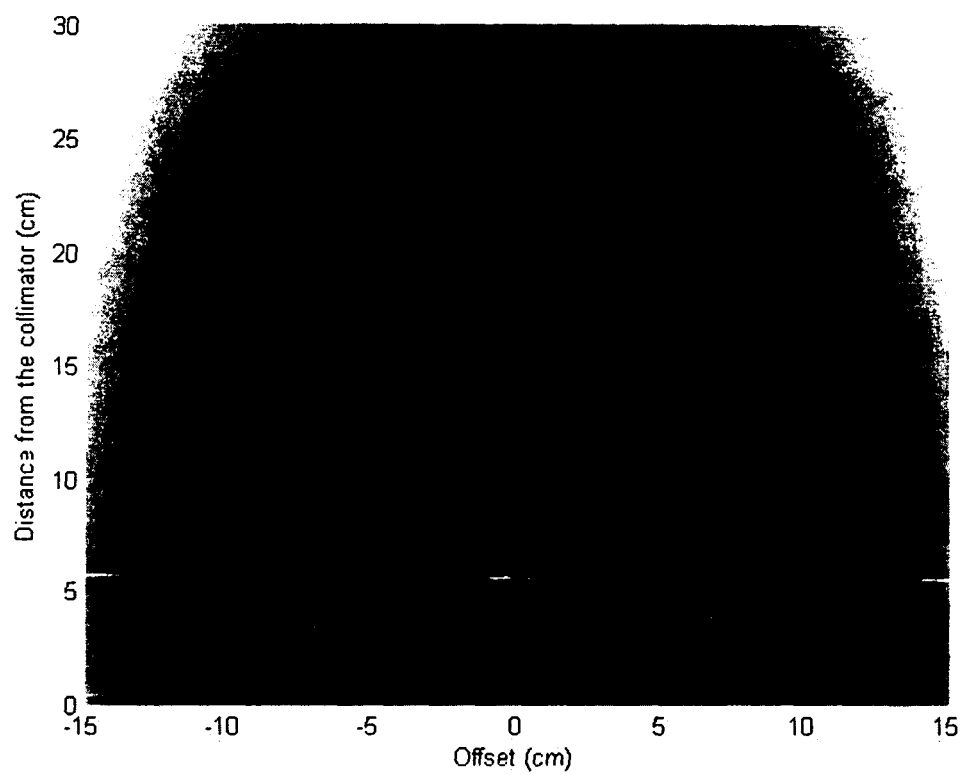
FIG. 10 illustrates a cross-section of an example of a pre-calculated three-dimensional sensitivity map.

FIG. 10 depicts a cross-section of one example of a pre-calculated three-dimensional sensitivity map in a 16×16×16 grid size (20 mm spacing) covering the entirety of the FOV of the collimator of the example SPECT imaging system. This sensitivity map was resampled according to the image volume size (128×128×128 matrix size) using a B-spline method, and was applied on an example initial image. Beginning with the example initial image, the convergence condition was satisfied after three iterations of the image reconstruction algorithm for the example SPECT imaging system.

Figure 11:
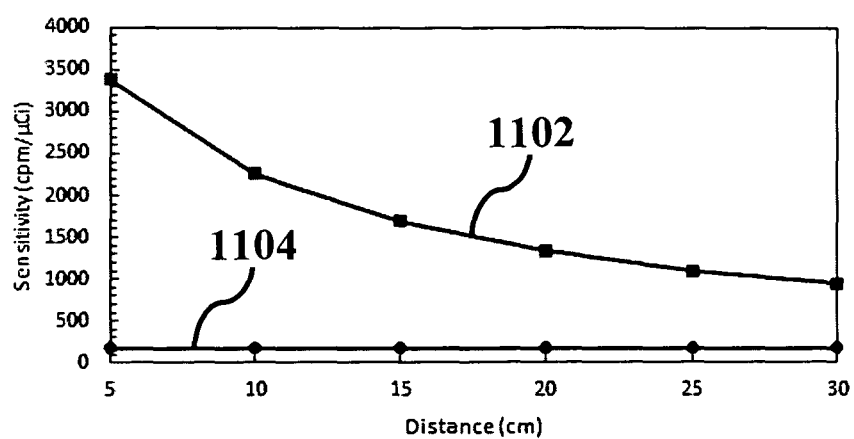
FIG. 11 illustrates variations of a first sensitivity for an example SPECT imaging system and a second sensitivity of a commercial cardiac parallel-hole collimated SPECT scanner for different distances from the collimator.

FIG. 11 presents a graph showing variations of a first sensitivity 1102 of the example SPECT imaging system, along with a second sensitivity 1104 of the RoboSPECT. The RoboSPECT is a commercial cardiac parallel-hole collimated SPECT scanner configured for different distances from the collimator. The sensitivity was calculated for a flood cylindrical source of $^{99m}$Tc (120 mm diameter and 10 mm height) located at a 20 cm distance (typical distance of a human's heart from the collimator). The example SPECT imaging system provided a 7.65 times higher sensitivity than that of the RoboSPECT scanner.

Figure 12:
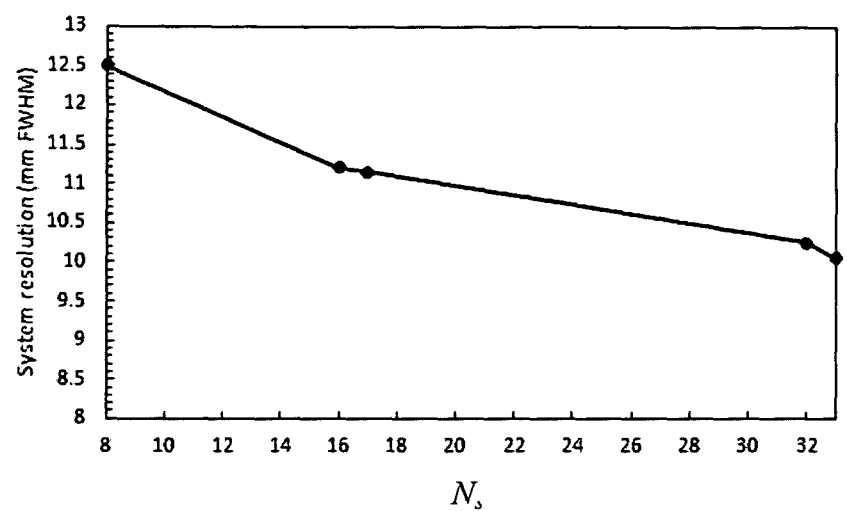
FIG. 12 illustrates variations of the system (planar) spatial resolution of an SPECT imaging system according to one implementation of the present disclosure.

FIG. 12 presents a graph that shows variations of the system (planar) spatial resolution of the example SPECT imaging system versus the number of the plurality of SPECT spin angles $N_s$. As $N_s$ increases, more data is acquired, and therefore the spatial resolution increases. The source-to-collimator distance is about 10 cm. Increasing the number of the plurality of SPECT spin angles from 16 to 32 improves the spatial resolution from about 11.3 mm to about 10.1 mm (a~10% improvement), while imposing a twofold total scan time. The spatial resolution was measured for a $^{99m}$Tc line source embedded in a cylindrical water phantom (~15 cm diameter, and ~30 cm length), as a scattering medium.

Figure 13A:
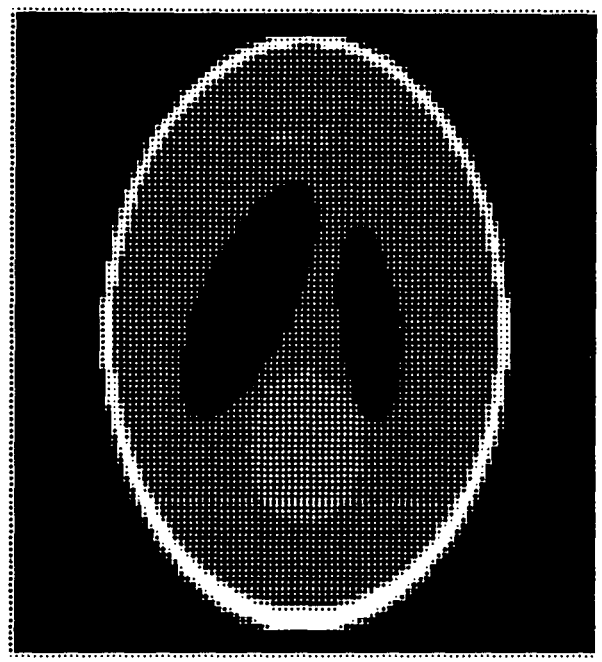
FIG. 13A illustrates a cross-section of a noise-free Shepp-Logan phantom according to one implementation of the present disclosure.
Figure 13B:
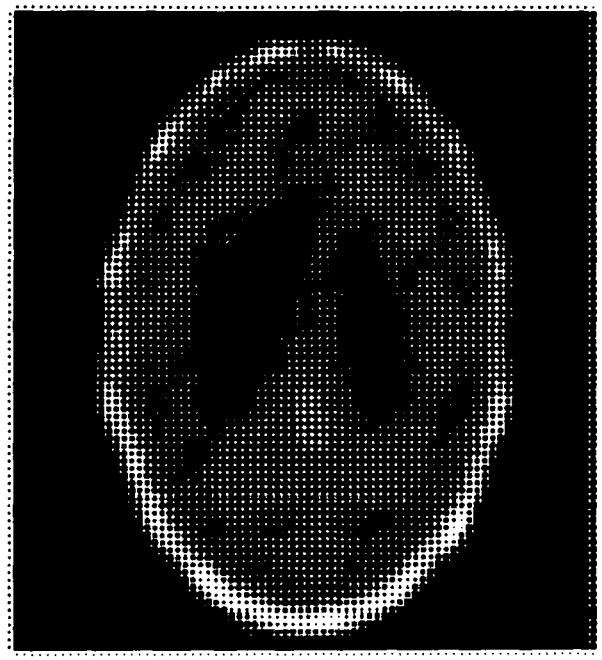
FIG. 13B is a tomographic image reconstructed by use of an implementation of the SPECT imaging method in an example SPECT imaging system with 8 SPECT spin angles and 8 SPECT rotation angles.
Figure 13C:
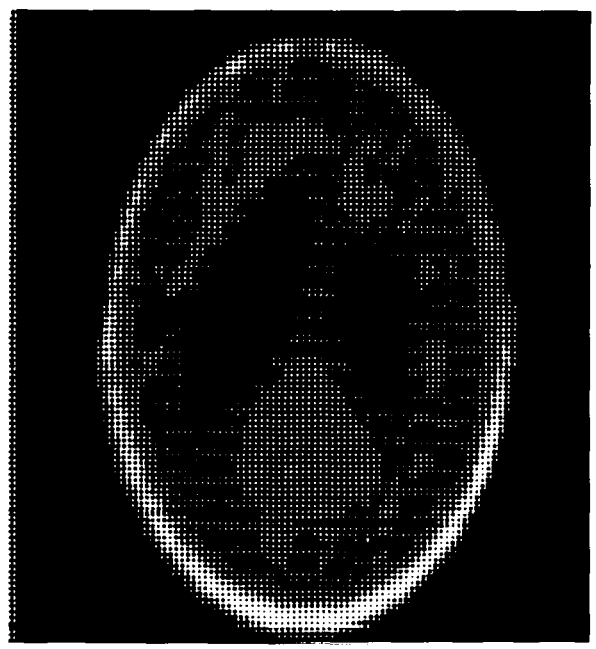
FIG. 13C is a tomographic image reconstructed by use of an implementation of the SPECT imaging method in an example SPECT imaging system with 16 SPECT spin angles and 16 SPECT rotation angles.

FIG. 13A depicts a cross-section of a noise-free Shepp-Logan phantom. FIG. 13B depicts a tomographic image reconstructed by using an implementation of the method 100 (see FIG. 1) in the example SPECT imaging system with 8 SPECT spin angles and 8 SPECT rotation angles. Finally, FIG. 13C depicts a tomographic image reconstructed by using an implementation of the method 100 in the example SPECT imaging system with 16 SPECT spin angles and 16 SPECT rotation angles.

The disclosed SPECT imaging system can potentially take advantage of interior tomography. In other words, the heart can be reconstructed in a substantially exact approximation, despite the truncation of the projection data. Thus there is no longer a need to use a large-FOV collimator-detector pair. In cases where the FOV entirely covers the heart (generally, a sphere of 10 cm diameter), the activity distribution in the heart can be exactly and uniquely reconstructed.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various implementations. This is for purposes of streamlining the disclosure, and is not to be interpreted as reflecting an intention that the claimed implementations require more features than are expressly recited in each claim. Rather, as the following claims reflect, inventive subject matter lies in less than all features of a single disclosed implementation. Thus, the following claims are hereby incorporated into the Detailed Description, with each claim standing on its own as a separately claimed subject matter.

While various implementations have been described, the description is intended to be exemplary, rather than limiting and it will be apparent to those of ordinary skill in the art that many more implementations and implementations are possible that are within the scope of the implementations. Although many possible combinations of features are shown in the accompanying figures and discussed in this detailed description, many other combinations of the disclosed features are possible. Any feature of any implementation may be used in combination with or substituted for any other feature or element in any other implementation unless specifically restricted. Therefore, it will be understood that any of the features shown and/or discussed in the present disclosure may be implemented together in any suitable combination. Accordingly, the implementations are not to be restricted except in light of the attached claims and their equivalents. Also, various modifications and changes may be made within the scope of the attached claims.

What is claimed is:

1. A method for single photon emission computed tomography (SPECT) imaging, the method comprising:
   acquiring a plurality of SPECT planar projection vectors by a SPECT imaging system that is configured to be disposed at a fixed radial distance from a center of an object being imaged, the plurality of SPECT planar projection vectors including a plurality of photopeak projection vectors and a plurality of scatter projection vectors, the SPECT imaging system including a gamma detector and a collimator, the collimator including a plurality of parallel slats, each of the plurality of parallel slats being perpendicular to a surface of the gamma detector;
   generating a plurality of scatter-corrected vectors from the plurality of SPECT planar projection vectors;
   generating a spinogram from the plurality of scatter-corrected vectors;
   producing a sensitivity map for the SPECT imaging system;

generating an initial image, where a center of the initial image corresponds to a center of the object; and reconstructing a final image from the initial image by applying an image reconstruction algorithm on the initial image, the image reconstruction algorithm comprising applying the sensitivity map on the initial image;

wherein acquiring the plurality of SPECT planar projection vectors comprises:

spinning the SPECT imaging system about a first spin axis that is perpendicular to the surface of the gamma detector and passes through the center of the object;

rotating the SPECT imaging system about a SPECT rotation axis that is perpendicular to the first spin axis and passes through the center of the object;

spinning the SPECT imaging system about a second spin axis of a plurality of spin axes that is perpendicular to the SPECT rotation axis and passes through the center of the object when a SPECT rotation angle of a plurality of SPECT rotation angles satisfies a condition according to $\theta = m\pi/N_r$, where:

$N_r$ is the number of the plurality of SPECT rotation angles, $0 \leq m < N_r$ is an integer number, and $\theta$ is the SPECT rotation angle, defined as an angle between the second spin axis and the first spin axis; and acquiring a SPECT planar projection vector of the plurality of SPECT planar projection vectors when a SPECT spin angle of a plurality of SPECT spin angles satisfies a condition according to $\alpha = \alpha_o + \eta\pi/N_s$, where:

$\alpha_o$ is a non-zero offset angle, $N_s$ is the number of the plurality of SPECT spin angles, $0 \leq \eta < N_s$ is an integer number associated to the SPECT planar projection vector, and $\alpha$ is the SPECT spin angle, defined as an angle between a collimator axis and the SPECT rotation axis, the collimator axis perpendicular to the planes of the plurality of parallel slats and passing through the center of the object.

2. The method of claim 1, wherein reconstructing the final image from the initial image is repeated in a cycle until a convergence condition is satisfied, and wherein the final image replaces the initial image at an end of each cycle.

3. The method of claim 1, wherein acquiring the SPECT planar projection vector comprises setting of the offset angle equal to $\pi/N_s$.

4. The method of claim 1, wherein generating the plurality of scatter-corrected vectors comprises generating each of the plurality of scatter-corrected vectors according to an operation defined by:

$$P_{corrected} = P_{photopeak} - k\left(S \times \frac{W_{photopeak}}{W_{scatter}}\right),$$

where $P_{corrected}$ is a scatter-corrected vector of the plurality of scatter-corrected vectors, $P_{photopeak}$ is a photopeak projection vector of the plurality of photopeak projection vectors, acquired at the SPECT rotation angle $\theta$ and the SPECT spin angle $\alpha$ in a photopeak window, S is a scatter projection vector of the plurality of scatter projection vectors, acquired at the SPECT rotation angle $\theta$ and the SPECT spin angle $\alpha$ in a scatter window, $W_{photopeak}$ is the width of the photopeak window, $W_{scatter}$ is the width of the scatter window, where $W_{scatter}$ # $W_{photopeak}$, and k is a calibration factor.

5. The method of claim 1, wherein generating the spinogram comprises generating a three-dimensional matrix that includes a first dimension corresponding to each of the plurality of scatter-corrected vectors, a second dimension corresponding to the plurality of SPECT spin angles, and a third dimension corresponding to the plurality of SPECT rotation angles.

6. The method of claim 1, wherein producing the sensitivity map comprises producing a three-dimensional matrix covering a field of view of the collimator.

7. The method of claim 1, wherein generating the initial image includes generating a three-dimensional all-ones matrix.

8. The method of claim 1, wherein reconstructing the final image comprises:

spinning the initial image about the first spin axis;

rotating the initial image about the SPECT rotation axis spinning the initial image about a third spin axis of the plurality of spin axes when an image rotation angle of a plurality of image rotation angles satisfies a condition according to $\theta' = m\pi/N_r$ where $\theta'$ is the image rotation angle, defined as an angle between the third spin axis and the first spin axis;

generating a modified image including a plurality of voxels by applying the sensitivity map on the initial image when an image spin angle of a plurality of image spin angles satisfies a condition according to a $\alpha' = -\alpha_o - \eta\pi/N_s$, where $\alpha'$ is the image spin angle, defined as an angle between an image axis and the SPECT rotation axis, wherein the image axis is parallel to the plane of the gamma detector, perpendicular to a surface of the initial image, and passes through the center of the initial image;

generating an image planar projection vector of the plurality of image planar projection vectors through a forward projection process, the image planar projection vector associated to the integer number $\eta$;

calculating a reconstruction error between the image planar projection vector and a scatter-corrected vector of the plurality of scatter-corrected vectors, the scatter-corrected vector corresponding to the image planar projection vector; and updating the modified image by backward projecting the reconstruction error to the modified image.

9. The method of claim 8, wherein generating the image planar projection vector includes calculating a value for each element in the image planar projection vector, the value including a sum of values of voxels in a voxels subset selected from the plurality of voxels, each voxel in the voxels subset located in an image plane of a plurality of image planes that is perpendicular to the image axis and passes through at least one of the plurality of voxels.

10. The method of claim 9, wherein updating the modified image includes multiplying the value of each voxel in the voxels subset by the reconstruction error.

11. The method of claim 8, wherein calculating the reconstruction error includes calculating a ratio between corresponding elements in the image planar projection vector and the scatter-corrected vector.

12. The method of claim 8, wherein reconstructing the final image from the initial image is repeated in a cycle until a convergence condition is satisfied, and wherein:
the final image replaces the initial image at the end of the cycle,
the convergence condition includes at least one of a first condition and a second condition,
the first condition includes the reconstruction error being smaller than a given threshold, and
the second condition includes repeatedly reconstructing the final image from the initial
image ten times.

13. A single photon emission computed tomography (SPECT) imaging system, the system comprising:
a gamma detector comprising a monolithic scintillator, a surface of the gamma detector being perpendicular to a first spin axis; and
a collimator comprising a plurality of parallel slats, each of the plurality of parallel slats being perpendicular to the surface of the gamma detector,
wherein the system is configured to:
be disposed at a fixed radial distance from an object being imaged;
spin about the first spin axis that passes through a center of the object;
rotate about a SPECT rotation axis that passes through the center of the object and is perpendicular to the first spin axis; and
acquire projection data when a SPECT spin angle of a plurality of SPECT spin angles satisfies a condition according to $\alpha = \alpha_o + \eta \pi / N_s$, where:
$\alpha_o$ is a non-zero offset angle,
$N_s$ is the number of the plurality of SPECT spin angles,
$0 \leq \eta < N_s$ is an integer number, and
$\alpha$ is the SPECT spin angle, defined as an angle between a collimator axis and the SPECT rotation axis, the collimator axis being perpendicular to the plurality of parallel slats.

14. The system of claim 13, wherein the gamma detector is coupled with a silicon photomultiplier (SiPM) readout system.

15. The system of claim 13, wherein the monolithic scintillator includes a monolithic CsI (Na) crystal.

16. The system of claim 13, wherein the offset angle is equal to $\pi/N_s$.

17. The system of claim 13, wherein the system is further configured to spin about a second spin axis of a plurality of spin axes that passes through the center of the object and is perpendicular to the SPECT rotation axis when a SPECT rotation angle of a plurality of SPECT rotation angles satisfies a condition according to $\theta = m\pi/N_r$, where
$N_r$ is the number of the plurality of SEPCT rotation angles,
$0 \leq m < N_r$ is an integer number, and
$\theta$ is the SEPCT rotation angle, defined as an angle between the second spin axis and the first spin axis.

18. The system of claim 17, wherein the number of the plurality of SPECT rotation angles is equal to or smaller than 16.

19. The system of claim 13, wherein the number of the plurality of SPECT spin angles is equal to or smaller than 16.

20. The system of claim 13, wherein the size of the SPECT imaging system is equal to or smaller than 30 cm×15 cm×5 cm.

* * * * *